United States Patent
Kanai

(10) Patent No.: US 9,696,679 B2
(45) Date of Patent: Jul. 4, 2017

(54) IMAGE FORMING APPARATUS

(71) Applicant: FUJI XEROX CO., LTD., Tokyo (JP)

(72) Inventor: Kenji Kanai, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 15/056,324

(22) Filed: Feb. 29, 2016

(65) Prior Publication Data

US 2017/0090394 A1    Mar. 30, 2017

(30) Foreign Application Priority Data

Sep. 25, 2015   (JP) .................. 2015-187638

(51) Int. Cl.
  *G03G 15/20* (2006.01)
  *G03G 15/00* (2006.01)
  *H04N 1/00* (2006.01)
  *H04N 1/29* (2006.01)
  *H04N 1/60* (2006.01)

(52) U.S. Cl.
  CPC ......... *G03G 15/80* (2013.01); *H04N 1/00904* (2013.01); *H04N 1/29* (2013.01); *H04N 1/6008* (2013.01)

(58) Field of Classification Search
  CPC ...... G03G 15/80; H04N 1/00904; H04N 1/29; H04N 1/6008
  See application file for complete search history.

(56) References Cited

U.S. PATENT DOCUMENTS

2013/0259527 A1*  10/2013  Arikawa ............ G03G 15/2017
                                                       399/122
2016/0342118 A1*  11/2016  Fukunaga .......... G03G 15/2085

FOREIGN PATENT DOCUMENTS

JP    2002-202698 A    7/2002
JP    2003-295553 A   10/2003

* cited by examiner

*Primary Examiner* — David M Gray
*Assistant Examiner* — Michael Harrison
(74) *Attorney, Agent, or Firm* — Oliff PLC

(57) ABSTRACT

An image forming apparatus includes a fixing device and an image forming apparatus body. The fixing device includes a pressure unit, a heating unit, a pressure adjuster that adjusts a pressure between the pressure unit and the heating unit, and a fixing-device-side connecting device. The image forming apparatus body to which the fixing device is detachably attached includes an electrical power unit, a drive device to which electrical power is supplied from the electrical power unit so as to drive the pressure adjuster, and a body-side connecting device connected to the electrical power unit. When the fixing device is detached from the image forming apparatus body, the body-side connecting device and the fixing-device-side connecting device are disconnected from each other and electrical power supply to the drive device is interrupted.

20 Claims, 11 Drawing Sheets

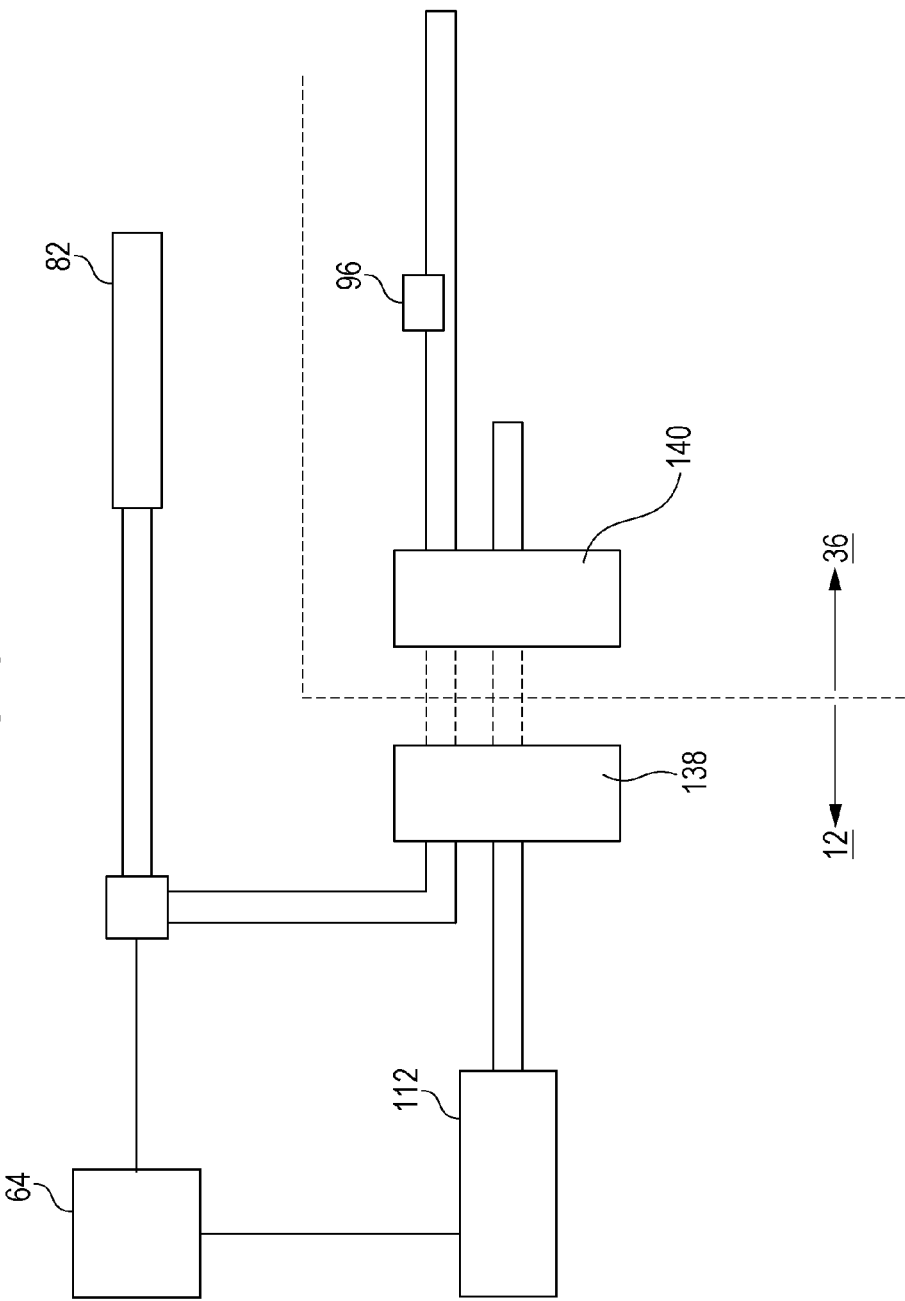

IMAGE FORMING APPARATUS

CROSS-REFERENCE TO RELATED APPLICATIONS

This application is based on and claims priority under 35 USC 119 from Japanese Patent Application No. 2015-187638 filed Sep. 25, 2015.

BACKGROUND

Technical Field

The present invention relates to an image forming apparatus.

SUMMARY

According to an aspect of the present invention, an image forming apparatus includes a fixing device and an image forming apparatus body. The fixing device includes a pressure unit, a heating unit that faces the pressure unit, a pressure adjuster that adjusts a pressure between the pressure unit and the heating unit, and a fixing-device-side connecting device. The image forming apparatus body to which the fixing device is detachably attached includes an electrical power unit, a drive device to which electrical power is supplied from the electrical power unit so as to drive the pressure adjuster, and a body-side connecting device connected to the electrical power unit. The fixing-device-side connecting device is disconnectably connected to the body-side connecting device. When the fixing device is detached from the image forming apparatus body, the body-side connecting device and the fixing-device-side connecting device are disconnected from each other and electrical power supply to the drive device is interrupted.

BRIEF DESCRIPTION OF THE DRAWINGS

Exemplary embodiment of the present invention will be described in detail based on the following figures, wherein:

FIG. 9 is a schematic view of an electrical power circuit according to the exemplary embodiment;

DETAILED DESCRIPTION

An exemplary embodiment of the present invention will be described below with reference to the drawings. It should be understood that the exemplary embodiment described below exemplifies an image forming apparatus that exemplarily embodies a technical thought of the present invention and is not intended to specify the present invention. The present invention is equally applicable to other exemplary embodiments included in the scope of the claims.

Exemplary Embodiment

Figure 1:
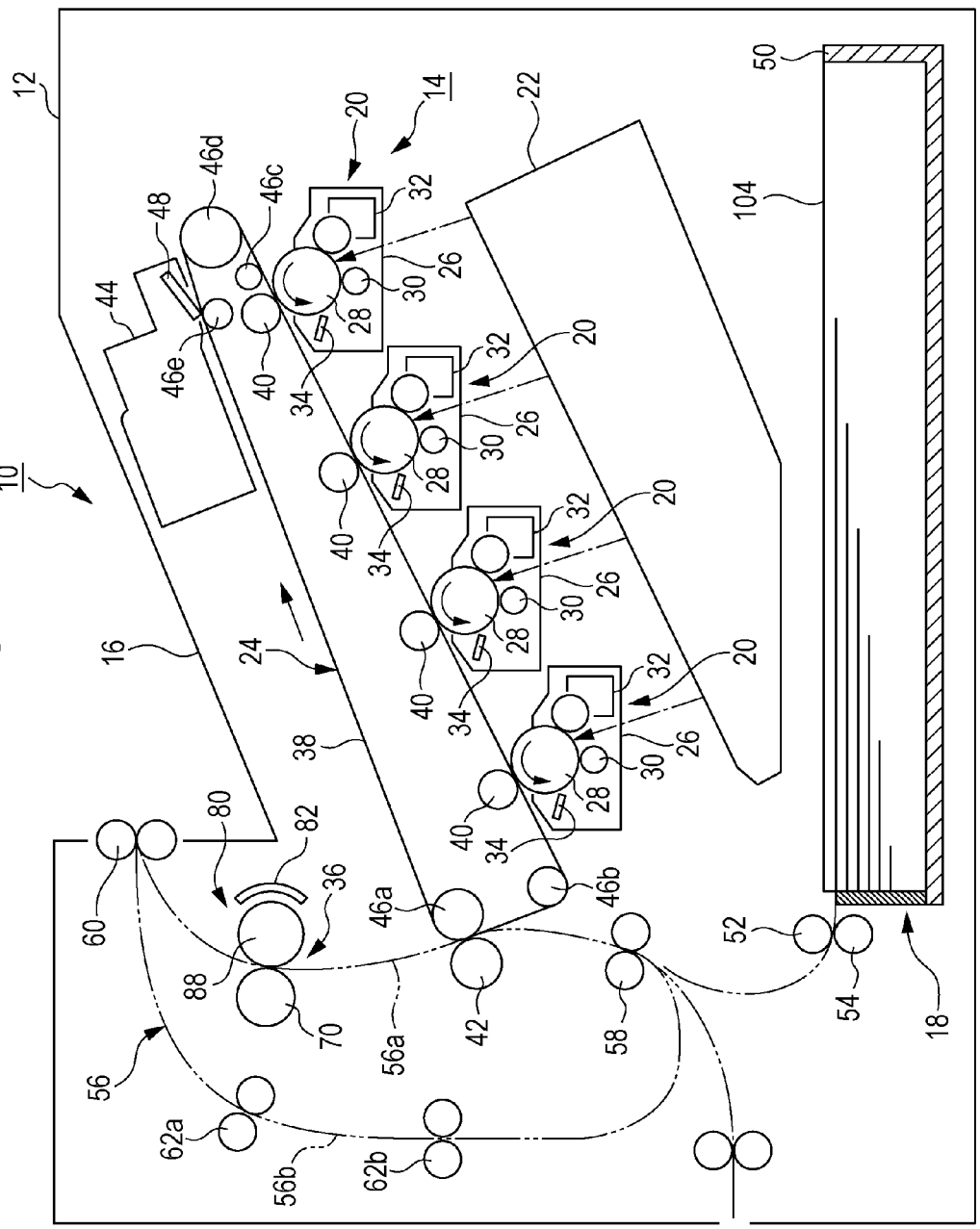
FIG. 1 is a side sectional view of an image forming apparatus according to an exemplary embodiment.

An image forming apparatus 10 according to the exemplary embodiment is described with reference to FIGS. 1 to 11C. As illustrated in FIG. 1, the image forming apparatus 10 according to the exemplary embodiment includes an image forming apparatus body 12. A recording medium supply device 18, an image forming section 14, and a fixing device 36 are disposed in the image forming apparatus body 12. An output section 16 is provided in an upper portion of the image forming apparatus body 12. The recording medium supply device 18 supplies recording media 104 such as recording paper serving as transfer target materials. The image forming section 14 forms images to be transferred onto the recording media 104. The recording media 104 are output to the output section 16. A transport path 56 is provided in the image forming apparatus 10. The recording media 104 are transported so as to pass through these components through the transport path 56. The details of these components are described below.

The recording medium supply device 18 includes a recording medium container 50, a transport roller 52, and a retard roller 54. The recording medium container 50 contains the recording media 104 stacked one on top of another. The transport roller 52 picks up an uppermost recording medium 104 out of the recording media 104 contained in the recording medium container 50 and transports the picked up recording medium 104 toward the image forming section 14. The retard roller 54 separates a single piece of the recording media 104 from the recording media 104 so as to prevent the plural recording media 104 superposed on one another from being transported to the image forming section 14.

The image forming section 14 includes process cartridges 20 corresponding to, for example, four colors, that is, yellow (Y), magenta (M), cyan (C), and black (K), an optical write device 22, and a transfer device 24. The process cartridges 20 including respective elements are structured similarly to or in the same manner as one another except for the colors of images formed by the process cartridges 20.

Each of the process cartridges 20 is used as a replaceable member detachably attached to the image forming apparatus body 12. The process cartridges 20, for example, corresponding to the Y, M, C, and K colors are arranged in this order from the rear side (right side of FIG. 1) of the image forming apparatus body 12.

The process cartridges 20 are, for example, of an electrophotographic type for forming color images. Each of the process cartridges 20 includes a process cartridge body 26. An image holding member 28, a charger 30, a developing device 32, and a cleaner 34 are provided in the process cartridge body 26. The drum-shaped image holding member 28 holds a developer image. The charger 30 serving as a charging device includes a charging roller that uniformly charges the image holding member 28. The developing device 32 develops a latent image having been written onto the image holding member 28 with the developer (toner). The cleaner 34 cleans the image holding member 28 by, for example, scraping off waste developer remaining on the image holding member 28.

The developing devices 32 develop the latent images formed on the respective image holding members 28 with the developer for the respective colors Y, M, C, and K contained therein.

The optical write device 22, which is used as a latent image forming device, includes, for example, a scanning-type laser exposure device and forms latent images on the surfaces of the image holding members 28. Alternatively, a device such as a light emitting diode (LED) or a surface emitting laser may be used as another exemplary embodiment of the optical write device 22.

The transfer device 24 includes a transfer target member 38 used as a transfer member, first transfer rollers 40 used as first transfer devices, a second transfer roller 42 used as a second transfer device, and a cleaner 44.

The transfer target member 38, which has, for example, an endless belt shape, is supported by five support rollers 46a, 46b, 46c, 46d, and 46e such that the transfer target member 38 is rotatable in a direction indicated by an arrow of FIG. 1. At least one of the support rollers 46a, 46b, 46c, 46d, and 46e is connected to a motive power source (not illustrated) such as a motor, thereby being rotated due to drive transmission received from this motive power source so as to rotate the transfer target member 38.

The support roller 46a faces the second transfer roller 42 and functions as a backup roller of the second transfer roller 42, thereby defining a second transfer position in a portion interposed between the second transfer roller 42 and the support roller 46a.

The first transfer rollers 40 transfer developer images formed on the surfaces of the respective image holding members 28 by the respective developing devices 32 to the transfer target member 38.

The second transfer roller 42 transfers the developer images of the Y, M, C, and K colors having been transferred onto the transfer target member 38 to the recording medium 104.

The cleaner 44 includes a scraper 48 that scrapes off the developer of the colors remaining on the surface of the transfer target member 38 after the developer images of the colors have been transferred onto the recording medium 104 by the second transfer roller 42. The developer having been scraped off by the scraper 48 is collected in a body of the cleaner 44.

The transport path 56 has a regular transport path 56a and an inversion transport path 56b.

The recording medium 104 supplied from the recording medium supply device 18 is transported to the image forming section 14 and, after the images have been formed on the recording medium 104, output to the output section 16 through the regular transport path 56a. The transport roller 52, the retard roller 54, a registration roller 58, the transfer device 24, the fixing device 36, and an output roller 60 are disposed along the regular transport path 56a in the order from an upstream side in a transport direction of the recording medium 104.

The registration roller 58 temporally stops a leading end portion of the recording medium 104 transported from the recording medium supply device 18 side and feeds the recording medium 104 toward the transfer device 24 at timing adjusted to timing of image formation.

The fixing device 36 includes a pressure unit 70 and a heating unit 80 that faces the pressure unit 70. By applying heat and pressure to the recording medium 104 passing through a nip between the pressure unit 70 and the heating unit 80, the developer images are fixed onto the recording medium 104. The details of the fixing device 36 will be described later.

The output roller 60 outputs the recording medium 104 onto which the developer is fixed by the fixing device 36 to the output section 16.

The recording medium 104 on one side of which the developer images have been formed is inverted while being supplied again to the image forming section 14 through the inversion transport path 56b. For example, two inversion transport rollers 62a and 62b are disposed along the inversion transport path 56b.

The recording medium 104 is supplied to the inversion transport path 56b by rotating the output roller 60 in a reverse direction when a trailing end portion of the recording medium 104 having been transported from the regular transport path 56a to the output roller 60 is nipped between the output roller 60 and a roller facing the output roller 60. The recording medium 104 having been supplied to the inversion transport path 56b is transported to a position on the upstream side of the registration roller 58 by the inversion transport rollers 62a and 62b.

Next, the fixing device 36 according to the exemplary embodiment is described. As illustrated in FIGS. 2 to 5, the fixing device 36 includes the pressure unit 70 and the heating unit 80 that faces the pressure unit 70. The heating unit 80 includes an induction heater element 82 (referred to as "IH element" hereafter) and a heat member 88 to be heated by the IH element 82. The fixing device 36 according to the exemplary embodiment is attachable to and detachable from the image forming apparatus body 12 (see FIGS. 3 to 5).

Figure 2:
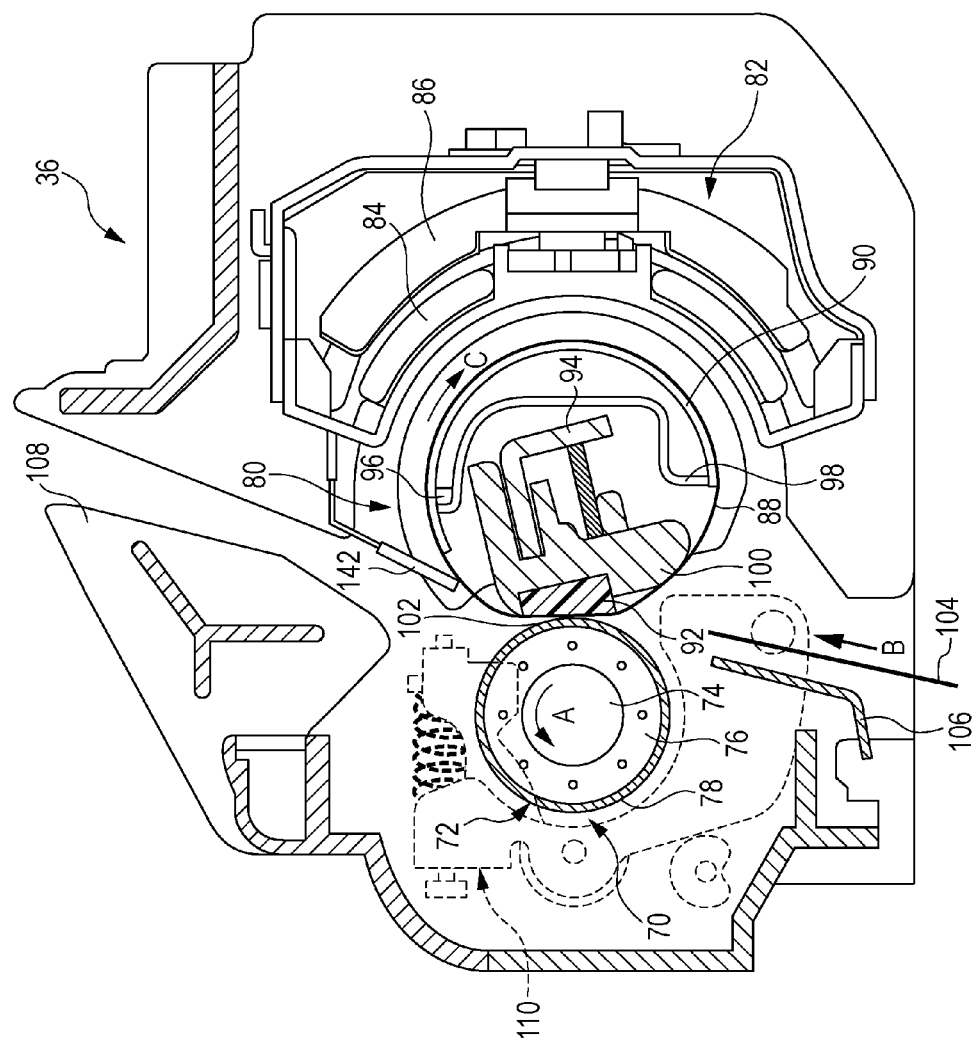
FIG. 2 is a side sectional view of a fixing device according to the exemplary embodiment.

The pressure unit 70 includes a cylindrical roller portion 72, faces the heat member 88, and is pressed against an outer surface of the heat member 88 so as to be rotated in an arrow A direction of FIG. 2. A pressure region 102 is formed in a state in which the heat member 88 is interposed between the pressure unit 70 and a pressure member 92. Heat and pressure are applied to the recording medium 104 bearing the unfixed developer images by causing this recording medium to pass through the pressure region 102, thereby fixing the unfixed developer images onto the recording medium 104.

The roller portion 72 is a so-called soft roller and includes, for example, a core 74 formed of metal such as iron, stainless steel, or aluminum, an elastic layer 76 that covers the core 74, and a mold release layer 78 that is provided as a film on the elastic layer 76 or applied to the elastic layer 76. The mold release layer 78 is formed of an insulating material having a good mold release property, for example, perfluoroalkoxy alkane (PFA) or the like.

The heat member 88 of the heating unit 80 is an endless belt having a cylindrical external shape and structured as, for example, a multilayer. For example, circular support members 89 that support the heat member 88 are provided at both ends in a longitudinal direction of the heat member 88. Heat member gears (not illustrated) that rotate the heat member 88 are provided in the support members 89. One of the heat member gears is connected to a drive device (not illustrated) such as a motor disposed in the image forming apparatus body 12.

A temperature-sensitive magnetic member 90 is provided on an inner circumferential side of the heat member 88 of the heating unit 80 on the IH element 82 side. The temperature-sensitive magnetic member 90 is spaced apart from the heat member 88. A shield member 98 that blocks a magnetic force leaking from the temperature-sensitive magnetic member 90 is provided on the inner circumferential side of the temperature-sensitive magnetic member 90. The shield member 98 is formed of, for example, aluminum. Furthermore, a holding member 100 is provided on the inner circumferential side of the heat member 88. The pressure member 92 is disposed at a position where the holding member 100 faces the pressure unit 70.

A frame 94 is provided between the shield member 98 and the pressure member 92. The frame 94 supports the temperature-sensitive magnetic member 90, the shield member 98, and the holding member 100 provided with the pressure member 92. Furthermore, a temperature sensor 96 that measures the temperature of the heat member 88 is provided on an inner surface of the heat member 88. Alternatively, the heat member 88 itself may include a magnetic layer so that the heat member 88 is directly heated by induction heating.

The IH element 82 includes a coil 84 for induction heating and a magnetic member 86 disposed on a side of the coil 84 opposite to the heat member 88. When electrical power is supplied to the coil 84, a magnetic field is formed, and accordingly, the heat member 88 and the temperature-sensitive magnetic member 90 generate heat. The heat member 88 is rotated in an arrow C direction so as to heat the developer images on the recording medium 104 transported in an arrow B direction (see FIG. 2).

The pressure member 92 is formed of, for example, a resin material such as silicone rubber. The pressure member 92 is disposed at a position facing the pressure unit 70 with the heat member 88 interposed therebetween so as to be in contact with the inner surface of the heat member 88.

By the pressure contact of the pressure member 92 of the heating unit 80 using the pressure unit 70, the pressure region 102 is formed. The developer images are fixed onto the recording medium 104 in the pressure region 102.

An inlet chute 106 is provided on the upstream side of the pressure region 102. The recording medium 104 transported in the arrow B direction is guided by the inlet chute 106, so that the leading end of the recording medium 104 is introduced into the pressure region 102 (see FIG. 2). Also, an outlet chute 108 is provided on the downstream side of the pressure region 102. A separation member 142 is provided in the fixing device 36 so as to be spaced apart from the surface of the heat member 88 by a specified distance.

Constant pressure contact between the pressure unit 70 and the heating unit 80 in the fixing device 36 may form impression in the pressure unit 70. In order to address this, a pressure adjuster 110 that adjusts pressure between the pressure unit 70 and the heating unit 80 is provided in the image forming apparatus body 12 and the fixing device 36 (see FIG. 6).

Figure 6:
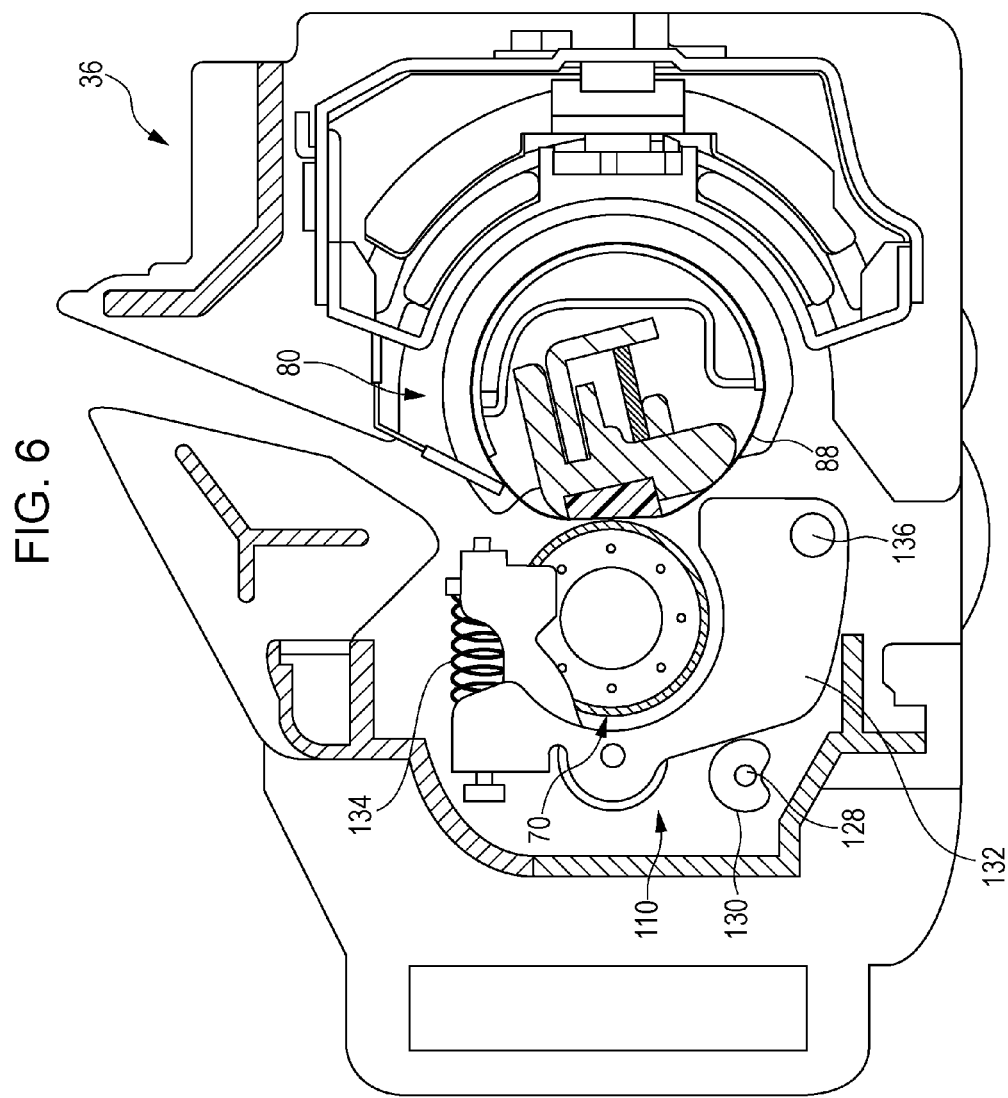
FIG. 6 is a side sectional view of a pressure adjuster according to the exemplary embodiment.
Figure 7:
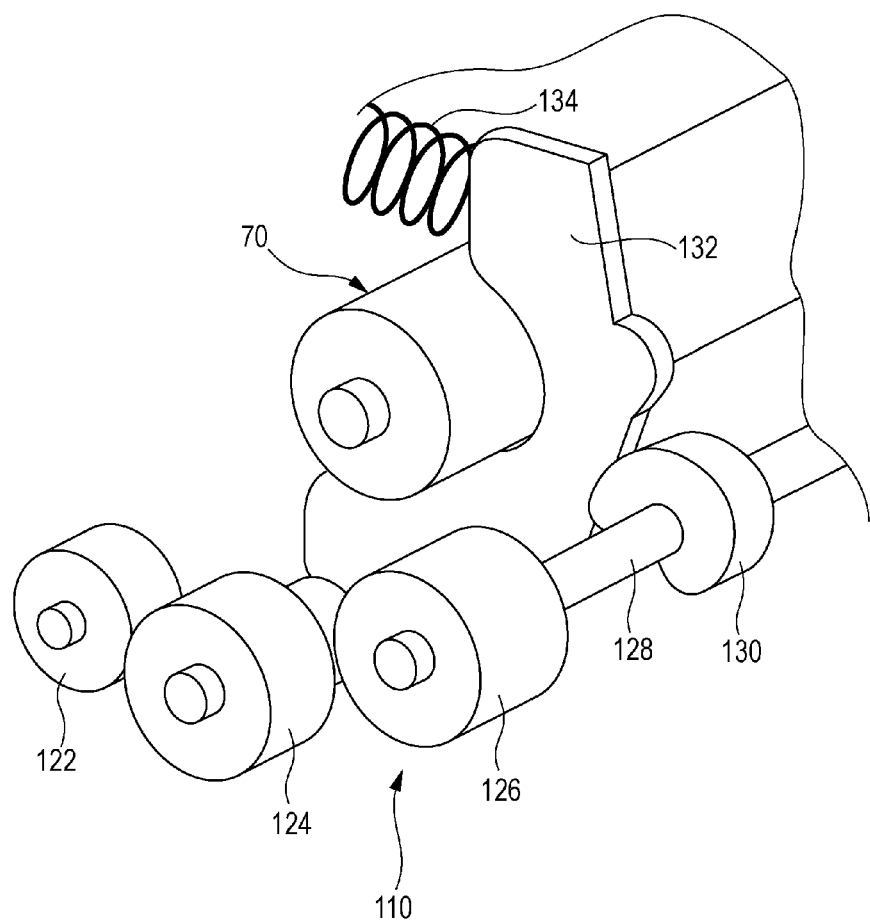
FIG. 7 is a schematic perspective view of the pressure adjuster according to the exemplary embodiment.

As illustrated in FIGS. 6 to 8, the pressure adjuster 110 adjusts the pressure by moving the pressure unit 70 so as to be close to or separated from the heating unit 80 by a drive force of a drive device 112 provided in the image forming apparatus body 12. In order to drive the pressure adjuster 110, the drive device 112 driven by the electrical power supplied from an electrical power unit 64 (see FIG. 9) and a body-side transmission mechanism 114 that transmits drive from the drive device 112 are provided in the image forming apparatus body 12. Also in order to drive the pressure adjuster 110, a fixing-device-side transmission mechanism 120 connected to the body-side transmission mechanism 114 so as to receive the drive is provided in the fixing device 36.

Furthermore, as illustrated in FIGS. 6 and 7, the pressure adjuster 110 includes a rotational shaft 128, at least one cam 130, and a movement member 132. The rotational shaft 128 is rotated by the drive transmitted to the fixing-device-side transmission mechanism 120. The cam 130 is provided at a position of the rotational shaft 128. The distance between the center and an outer circumference of the cam 130 is non-uniform. The movement member 132 is in contact with the cam 130 and moved in accordance with a movement of the cam 130. By coupling a movement of the pressure unit 70 with the movement of the movement member 132, the distance between the pressure unit 70 and the heating unit 80 is changed, so that the pressure unit 70 is moved between a state in which the pressure unit 70 is in pressure contact with the heating unit 80 and a state in which the pressure unit 70 is separated from the heating unit 80.

The drive device 112 is, for example, a motor provided in the image forming apparatus body 12. Rotation of this motor is used as the drive force.

The body-side transmission mechanism 114 includes plural gears engaged with one another. The gears of the body-side transmission mechanism 114 at least include a first gear 116 rotated by the drive device 112 and a second gear 118 serving as one transmission device connected to a gear 122 at an end portion of the fixing-device-side transmission mechanism 120 (see FIG. 10).

The fixing-device-side transmission mechanism 120 includes plural gears engaged with one another. The gears of the fixing-device-side transmission mechanism 120 at least include the third gear 122 serving as another transmission device connected to the second gear 118 of the body-side transmission mechanism 114 and a fourth gear 126 that rotates the rotational shaft 128. According to the exemplary embodiment, an intermediate gear 124 is provided between the third gear 122 and the fourth gear 126 (see FIG. 10).

Furthermore, according to the exemplary embodiment, the third gear 122 of the fixing-device-side transmission mechanism 120 is a so-called swinging gear, that is, the position of the third gear 122 is movable while being engaged with the intermediate gear 124 (see FIG. 11). This third gear 122 is moved about the axis of the intermediate gear 124 as the center of the movement. Furthermore, the third gear 122 is rotated while being engaged with the second gear 118.

The rotational shaft 128 has a thin rod shape extending in a longitudinal direction of the pressure unit 70 of the fixing device 36. The fourth gear 126 and the cam 130 are attached at respective specified positions of the rotational shaft 128.

The cam 130 is a so-called eccentric cam. The distance between the center of the rotational shaft 128 to which the cam 130 is attached and the outer circumference of the cam 130 is non-uniform. By rotating the cam 130, the movement member 132 is moved in accordance with the position where the movement member 132 is in contact with the cam 130. The outer circumference of the cam 130 is flat.

The movement member 132 is, for example, a substantially L-shaped metal sheet surrounding the pressure unit 70. The movement member 132 is attached in the fixing device 36 by using a shaft portion 136 that is different from the rotational shaft 128 of the pressure unit 70 and rotated about the shaft portion 136 as the axis of the rotation.

The movement member 132 is provided with an urging device 134 such as a spring. The urging device 134 has an urging force in a direction in which the movement member 132 is separated from the heating unit 80. With the urging force of the urging device 134 and the rotation of the cam 130, the pressure unit 70 is moved between a position where the pressure unit 70 applies pressure to the heating unit 80 and a position where the pressure unit 70 is separated from the heating unit 80.

Figure 8A:
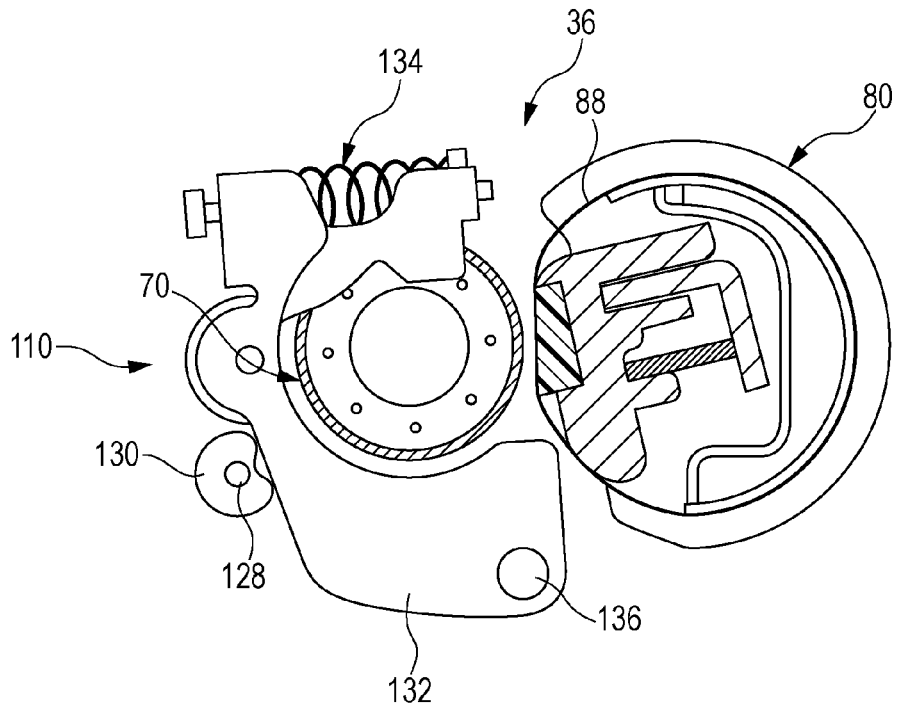
FIG. 8A is a side sectional view illustrating a state in which a pressure unit and a heating unit of the fixing device according to the exemplary embodiment are separated from each other.

In order to separate the pressure unit 70 from the heating unit 80 by the pressure adjuster 110, as illustrated in FIG. 8A, the rotational shaft 128 and the cam 130 are rotated by the drive force produced by driving the drive device 112 and transmitted through the body-side transmission mechanism 114 and the fixing-device-side transmission mechanism 120 so as to set the movement member 132 at a position where the distance between the rotational shaft 128 and the outer circumference of the cam 130 is short. Thus, the movement member 132 is moved by the urging force of the urging device 134, and, corresponding to the movement of the movement member 132, the pressure unit 70 is moved in the direction separated from the heating unit 80. This reduces or eliminates the pressure.

Figure 8B:
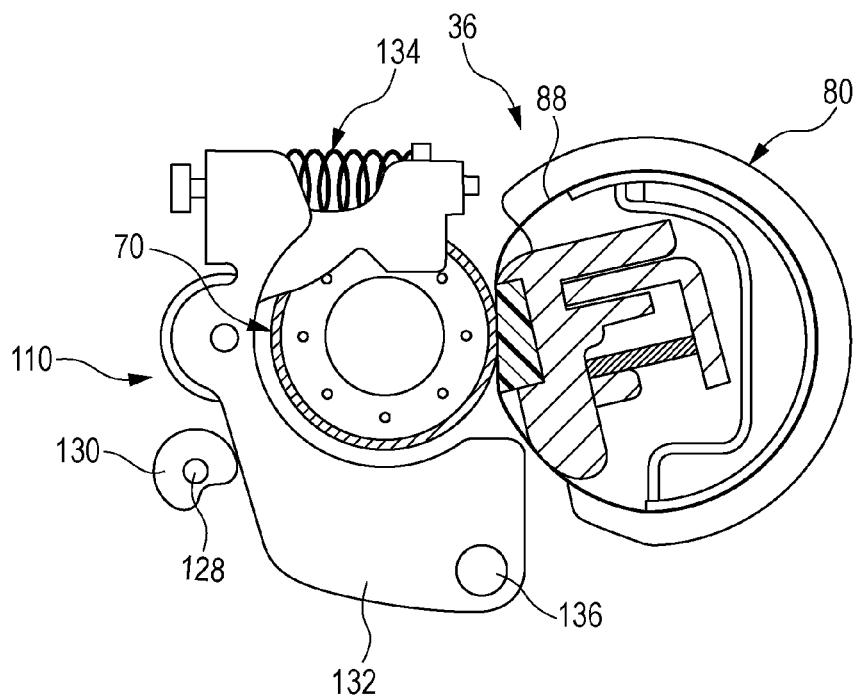
FIG. 8B is a side sectional view illustrating a state in which the pressure unit and the heating unit of the fixing device according to the exemplary embodiment are subjected to pressure.

In contrast, in order to move the pressure unit 70 close to the heating unit 80, as illustrated in FIG. 8B, the rotational shaft 128 and the cam 130 are rotated by the drive force produced by driving the drive device 112 and transmitted through the body-side transmission mechanism 114 and the fixing-device-side transmission mechanism 120 so as to set the movement member 132 at a position where the distance between the rotational shaft 128 and the outer circumference of the cam 130 is large. Thus, the movement member 132 is moved against the urging force of the urging device 134, and, corresponding to the movement of the movement member 132, the pressure unit 70 is moved in the direction approaching the heating unit 80. This brings the pressure unit 70 into contact with the heating unit 80 so as to produce the pressure.

Figure 10:
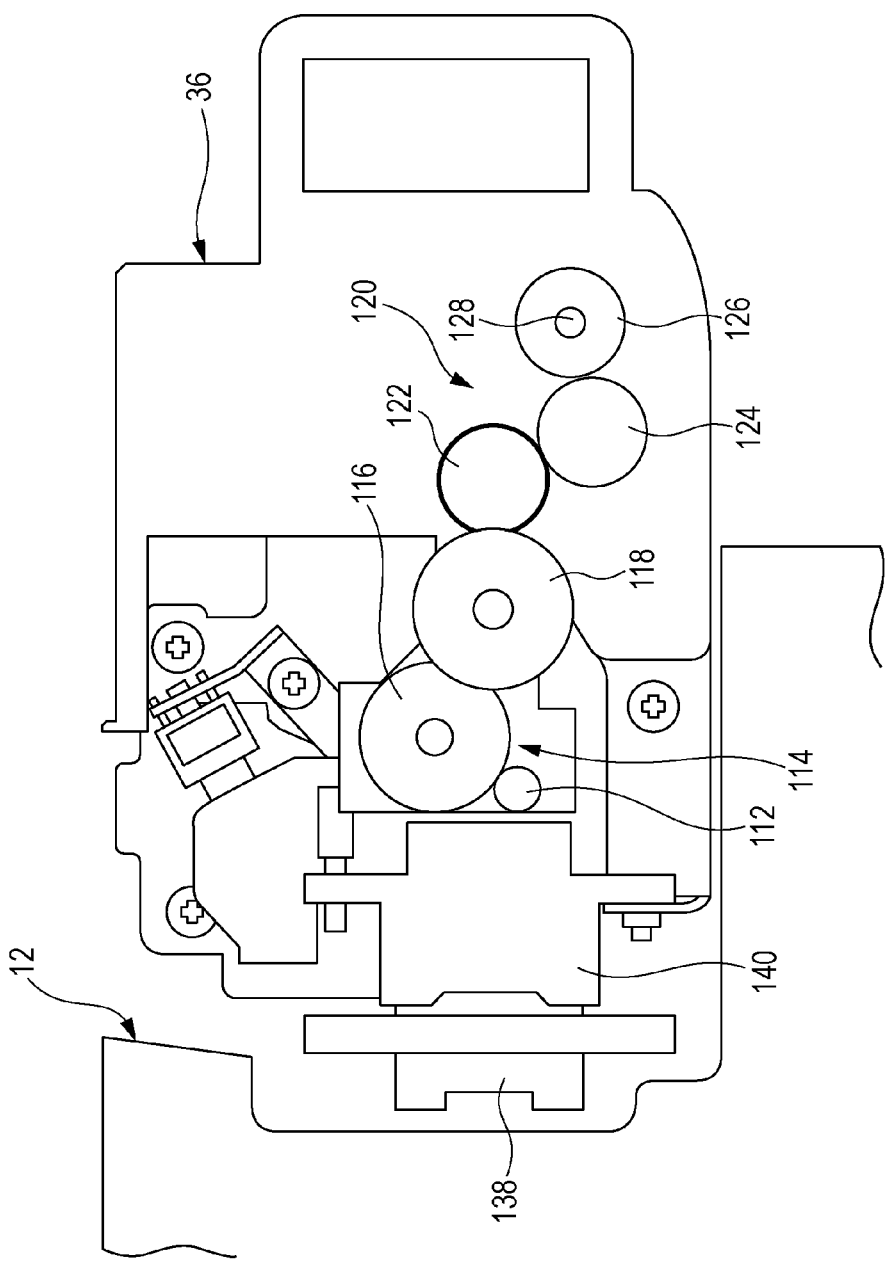
FIG. 10 is a side sectional view of the image forming apparatus body and the fixing device according to the exemplary embodiment.

Furthermore, as illustrated in FIGS. 9 and 10, a body-side connector 138 serving as a body-side connecting device and a fixing-device-side connector 140 serving as a fixing-device-side connecting device are provided in the image forming apparatus 10 according to the exemplary embodiment. The body-side connector 138 is connected to the electrical power unit 64 disposed in the image forming apparatus body 12. The fixing-device-side connector 140 is disposed in the fixing device 36 and electrically connected to the body-side connector 138. The body-side connector 138 and the fixing-device-side connector 140 are connectable to and disconnectable from each other. The body-side connector 138 and the fixing-device-side connector 140 are connected to each other or disconnected from each other when the fixing device 36 is attached or detached.

The body-side connector 138 and the fixing-device-side connector 140 according to the exemplary embodiment is so-called drawer connectors. The drawer connecters connected to each other as a single pair of drawer connectors allow electrical circuitry and electrical power circuitry to be connected therethrough.

A controller (not illustrated) that is provided in the image forming apparatus body 12, includes a central processing unit (CPU), a read-only memory (ROM), a random access memory (RAM), and so forth, and stores a variety of programs transmits electrical signals. The electrical signals from the controller are transmitted and the electrical power is supplied to the drive device 112 and the IH element 82 through the body-side connector 138 and the fixing-device-side connector 140 in the image forming apparatus 10 according to the exemplary embodiment.

More specifically, as illustrated in FIG. 9, an electrical power circuit for the drive device 112 is connected to the electrical power unit 64. After that, the electrical power circuit for the drive device 112 extends through the body-side connector 138, the fixing-device-side connector 140, and then the body-side connector 138 again, and is connected to the drive device 112 in the image forming apparatus 10 according to the exemplary embodiment. With such a circuit configuration, when the body-side connector 138 and the fixing-device-side connector 140 are disconnected from each other, the electrical power circuit to the drive device 112 is interrupted, and accordingly, the drive device 112 is stopped.

Regarding an electrical power circuit for the IH element 82, the electrical power circuit for the IH element 82 is connected to the electrical power unit 64. After that, the electrical power circuit for the IH element 82 extends through the body-side connector 138, the fixing-device-side connector 140, and then the body-side connector 138, and is connected to the IH element 82 in the image forming apparatus body 12. It is noted that, according to the exemplary embodiment, the temperature sensor 96 in the fixing device 36 is provided in the electrical power circuit for the IH element 82. With such a circuit configuration, when the body-side connector 138 and the fixing-device-side connector 140 are disconnected from each other, the electrical power supply to the IH element 82 is interrupted, and accordingly, the IH element 82 is stopped.

Figure 3:
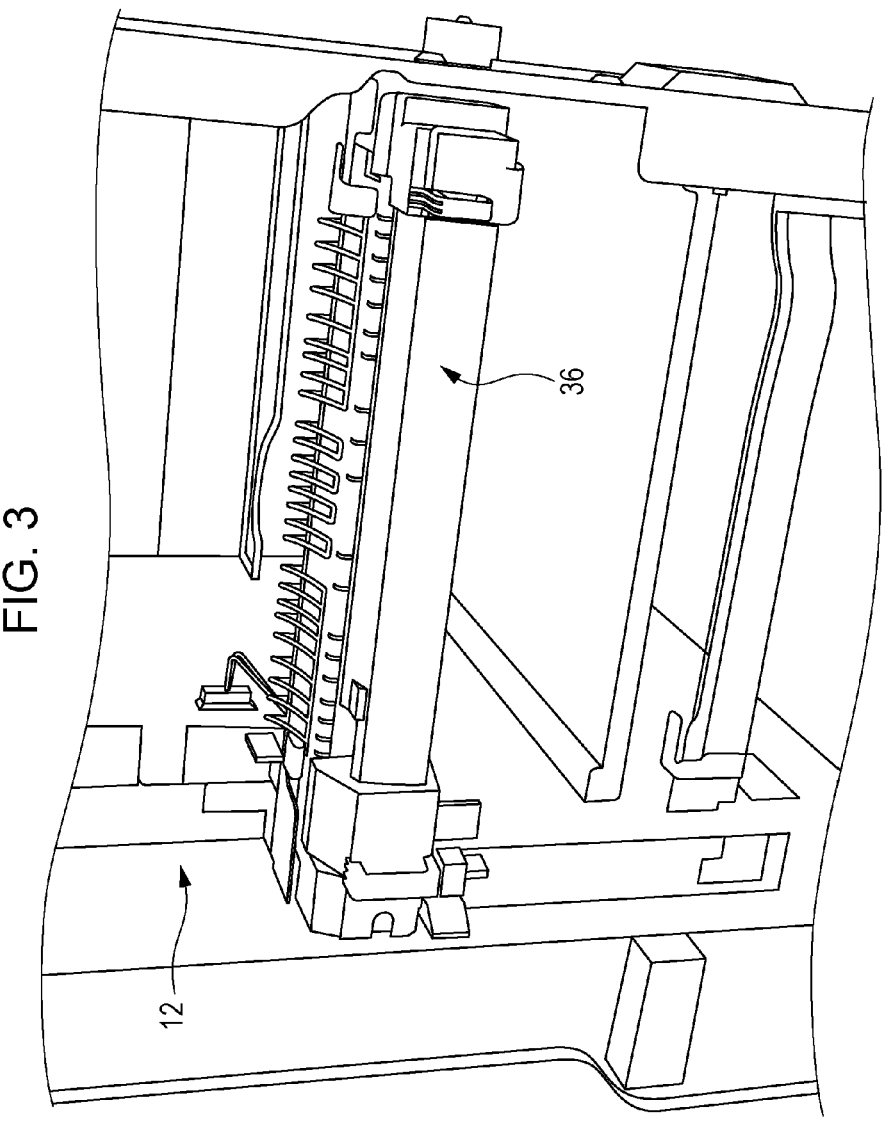
FIG. 3 is a perspective view of the fixing device disposed in an image forming apparatus body according to the exemplary embodiment.
Figure 4:
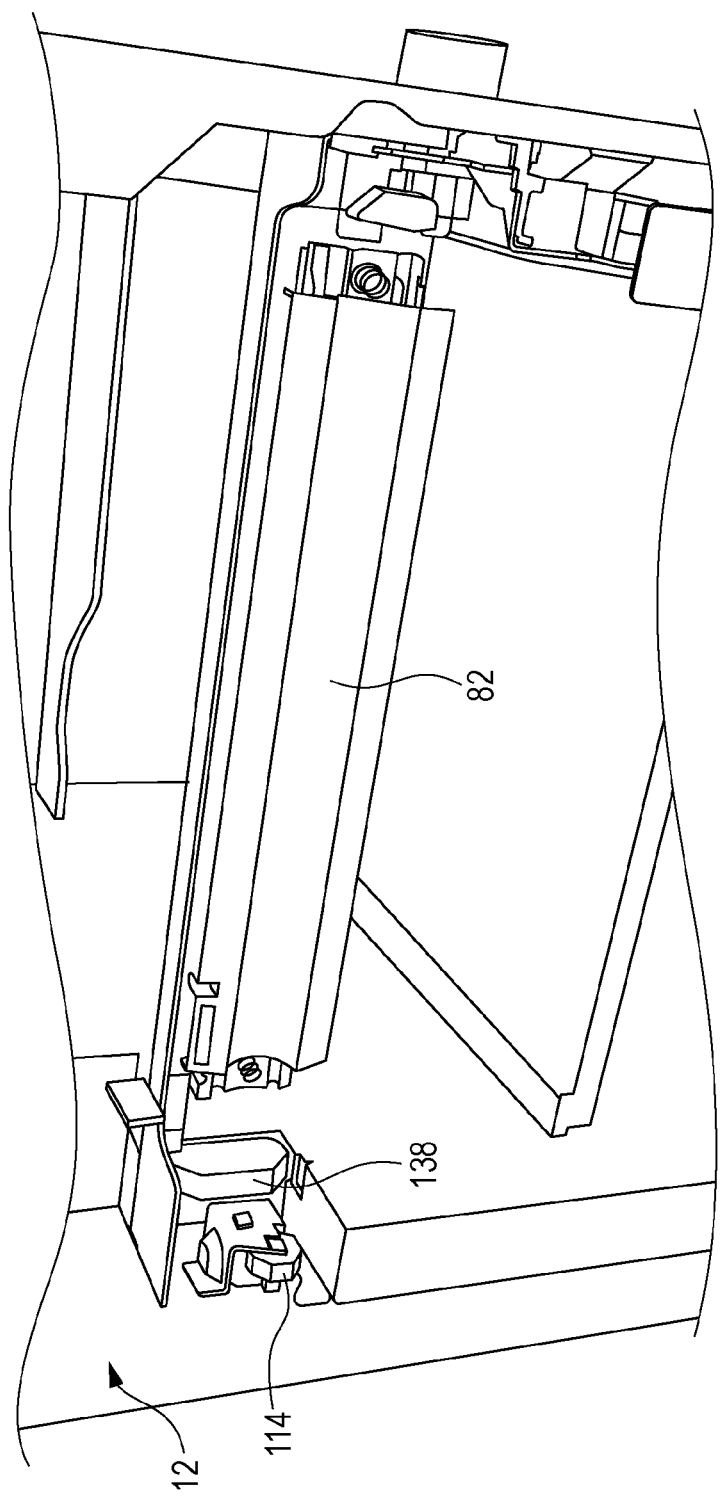
FIG. 4 is a perspective view of the inside of the image forming apparatus body according to the exemplary embodiment from which the fixing device has been detached.
Figure 5:
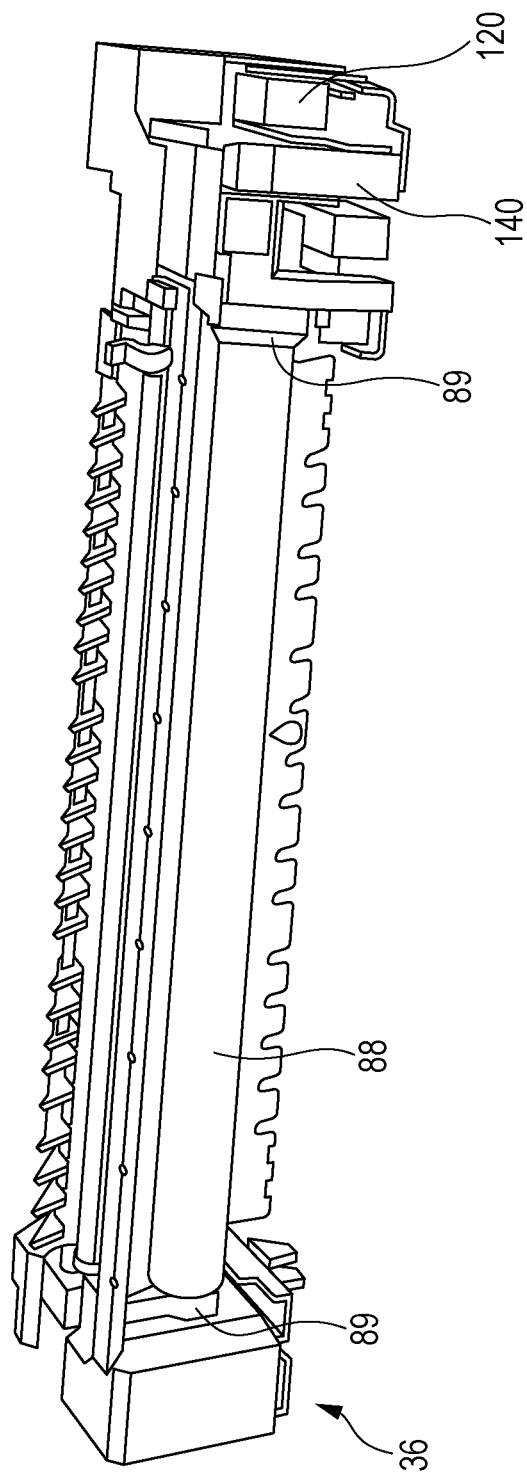
FIG. 5 is a perspective view of the fixing device according to the exemplary embodiment.
Figure 11A:
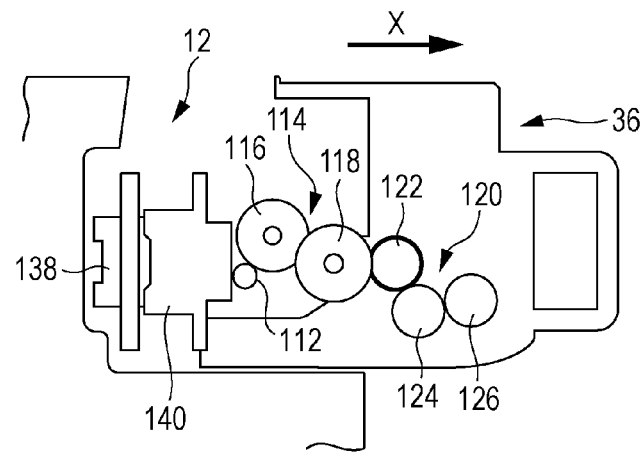
FIGS. 11A to 11C are schematic sectional views illustrating processes for detaching the fixing device from the image forming apparatus body according to the exemplary embodiment.
Figure 11B:
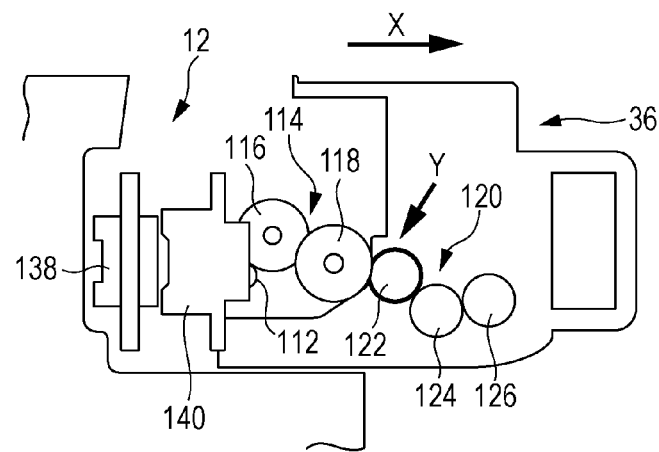
Figure 11C:
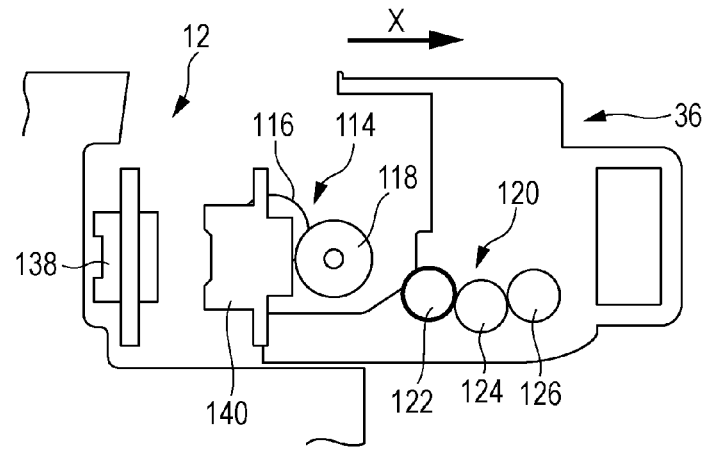

Referring next to FIGS. 10 to 11C, detachment of the fixing device 36 from the image forming apparatus body 12 is described. The fixing device 36 provided in the image forming apparatus 10 according to the exemplary embodiment is attachable and detachable as illustrated in FIGS. 3 to 5. At this time, the fixing device 36 is detached with the IH element 82 left in the image forming apparatus body 12 (see FIG. 4).

In order to detach the fixing device 36 from the image forming apparatus body 12, a side covering of the image forming apparatus body 12 is initially opened so as to expose the fixing device 36. At this time, the electrical power is supplied to the drive device 112 that drives the pressure adjuster 110 of the fixing device 36 and the IH element 82 in the image forming apparatus 10 according to the exemplary embodiment.

Next, the fixing device 36 is removed. The removal of the fixing device 36 is performed, as illustrated in FIG. 11A, by drawing the fixing device 36 in an arrow X direction. This separates the fixing device 36 from the image forming apparatus body 12. In the middle of this separation of the fixing device 36 from the image forming apparatus body 12, the body-side connector 138 of the image forming apparatus body 12 and the fixing-device-side connector 140 of the fixing device 36 are disconnected from each other, thereby interrupting the transmission of the electrical signals and the electrical power supply to the drive device 112 and the IH element 82.

With such a configuration, the drive device 112 of the pressure adjuster 110 is not stopped when the covering of the image forming apparatus body 12 is opened. This may prevent the formation of the impression. Furthermore, when the fixing device 36 is detached from the image forming apparatus body 12, the fixing-device-side connector 140 and the body-side connector 138 are disconnected from each other. Thus, the electrical power supply to the drive device 112 and the IH element 82 is interrupted. This may ensure safety while the fixing device 36 is detached.

Meanwhile, immediately after the body-side connector 138 and the fixing-device-side connector 140 have been disconnected from each other, as illustrated in FIG. 11B, the body-side transmission mechanism 114 and the fixing-device-side transmission mechanism 120 are connected to each other. That is, regarding the body-side transmission mechanism 114 of the image forming apparatus body 12 and the fixing-device-side transmission mechanism 120 of the fixing device 36, as the third gear 122 being the swinging gear at the end portion of the fixing-device-side transmission mechanism 120 is separated from the fixing device 36, the third gear 122 is moved in an arrow Y direction so as to be moved along an outer circumference of the second gear 118 disposed at an end portion of the body-side transmission mechanism 114 while the third gear 122 is transmitting the drive. Thus, although the drive device 112 is stopped in the case where, for example, the fixing device 36 is detached during the movement of the pressure unit 70 by the pressure adjuster 110, the third gear 122 and the second gear 118 of the heating unit 80 are still connected. Accordingly, rotation of the drive device 112 due to inertia occurring when the electrical power supply is interrupted may be more quickly stopped by utilizing resistance of the pressure adjuster 110.

After that, by further drawing the fixing device 36 in the arrow X direction, as illustrated in FIG. 11C, the body-side transmission mechanism 114 and the fixing-device-side transmission mechanism 120 are separated from each other. Thus, the detachment of the fixing device 36 is completed.

Although the IH element is used for the heating unit of the image forming apparatus according to the exemplary embodiment, this is not limiting. A lamp heater may instead be used for the heating unit.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    a fixing device that includes
        a pressure unit,
        a heating unit that faces the pressure unit,
        a pressure adjuster that adjusts a pressure between the pressure unit and the heating unit, and
        a fixing-device-side connecting device; and
    an image forming apparatus body to which the fixing device is detachably attached and which includes,
        an electrical power unit,
        a drive device to which electrical power is supplied from the electrical power unit so as to drive the pressure adjuster, and
        a body-side connecting device connected to the electrical power unit,
    wherein the fixing-device-side connecting device is disconnectably connected to the body-side connecting device, and
    wherein, when the fixing device is detached from the image forming apparatus body, the body-side connecting device and the fixing-device-side connecting device are disconnected from each other and electrical power supply to the drive device is interrupted.

2. The image forming apparatus according to claim 1,
    wherein the electrical power is supplied to the drive device through the body-side connecting device, the fixing-device-side connecting device, and then the body-side connecting device again.

3. The image forming apparatus according to claim 1,
    wherein the electrical power is supplied to the heating unit through the body-side connecting device, the fixing-device-side connecting device, and then the body-side connecting device again, and
    wherein, when the fixing device is detached from the image forming apparatus body, the body-side connecting device and the fixing-device-side connecting device are disconnected from each other and electrical power supply to the heating unit is interrupted.

4. The image forming apparatus according to claim 2,
    wherein the electrical power is supplied to the heating unit through the body-side connecting device, the fixing-device-side connecting device, and then the body-side connecting device again, and
    wherein, when the fixing device is detached from the image forming apparatus body, the body-side connecting device and the fixing-device-side connecting device are disconnected from each other and electrical power supply to the heating unit is interrupted.

5. The image forming apparatus according to claim 1,
    wherein the image forming apparatus body further includes
        a body-side transmission mechanism that transmits a drive force from the drive device,
    wherein the fixing device further includes
        a fixing-device-side transmission mechanism connected to the body-side transmission mechanism,
    wherein the pressure adjuster is driven by the drive force transmitted to the fixing-device-side transmission mechanism so as to adjust the pressure between the pressure unit and the heating unit, and
    wherein, during detachment of the fixing device from the image forming apparatus body, the body-side transmission mechanism and the fixing-device-side transmission mechanism are connected to each other while the body-side connecting device and the fixing-device-side connecting device are disconnected from each other.

6. The image forming apparatus according to claim 2,
    wherein the image forming apparatus body further includes
        a body-side transmission mechanism that transmits a drive force from the drive device,
    wherein the fixing device further includes
        a fixing-device-side transmission mechanism connected to the body-side transmission mechanism,
    wherein the pressure adjuster is driven by the drive force transmitted to the fixing-device-side transmission mechanism so as to adjust the pressure between the pressure unit and the heating unit, and
    wherein, during detachment of the fixing device from the image forming apparatus body, the body-side transmission mechanism and the fixing-device-side transmission mechanism are connected to each other while the body-side connecting device and the fixing-device-side connecting device are disconnected from each other.

7. The image forming apparatus according to claim 3,
    wherein the image forming apparatus body further includes a body-side transmission mechanism that transmits a drive force from the drive device,
wherein the fixing device further includes
a fixing-device-side transmission mechanism connected to the body-side transmission mechanism,
wherein the pressure adjuster is driven by the drive force transmitted to the fixing-device-side transmission mechanism so as to adjust the pressure between the pressure unit and the heating unit, and
wherein, during detachment of the fixing device from the image forming apparatus body, the body-side transmission mechanism and the fixing-device-side transmission mechanism are connected to each other while the body-side connecting device and the fixing-device-side connecting device are disconnected from each other.

8. The image forming apparatus according to claim 4,
wherein the image forming apparatus body further includes
a body-side transmission mechanism that transmits a drive force from the drive device,
wherein the fixing device further includes
a fixing-device-side transmission mechanism connected to the body-side transmission mechanism,
wherein the pressure adjuster is driven by the drive force transmitted to the fixing-device-side transmission mechanism so as to adjust the pressure between the pressure unit and the heating unit, and
wherein, during detachment of the fixing device from the image forming apparatus body, the body-side transmission mechanism and the fixing-device-side transmission mechanism are connected to each other while the body-side connecting device and the fixing-device-side connecting device are disconnected from each other.

9. The image forming apparatus according to claim 5,
wherein the body-side transmission mechanism includes
an end portion, and
one transmission device disposed at the end portion thereof,
wherein the fixing-device-side transmission mechanism includes
an end portion, and
another transmission device disposed at the end portion thereof,
wherein the one transmission device and the other transmission device are disconnectably connected to each other,
wherein the other transmission device is movable while being connected to the one transmission device, and
wherein, during the detachment of the fixing device from the image forming apparatus body, the other transmission device of the fixing-device-side transmission mechanism transmits the drive force, and a position of the other transmission device is moved while the other transmission device is connected to the one transmission device.

10. The image forming apparatus according to claim 6,
wherein the body-side transmission mechanism includes
an end portion, and
one transmission device disposed at the end portion thereof,
wherein the fixing-device-side transmission mechanism includes
an end portion, and
another transmission device disposed at the end portion thereof,
wherein the one transmission device and the other transmission device are disconnectably connected to each other,
wherein the other transmission device is movable while being connected to the one transmission device, and
wherein, during the detachment of the fixing device from the image forming apparatus body, the other transmission device of the fixing-device-side transmission mechanism transmits the drive force, and a position of the other transmission device is moved while the other transmission device is connected to the one transmission device.

11. The image forming apparatus according to claim 7,
wherein the body-side transmission mechanism includes
an end portion, and
one transmission device disposed at the end portion thereof,
wherein the fixing-device-side transmission mechanism includes
an end portion, and
another transmission device disposed at the end portion thereof,
wherein the one transmission device and the other transmission device are disconnectably connected to each other,
wherein the other transmission device is movable while being connected to the one transmission device, and
wherein, during the detachment of the fixing device from the image forming apparatus body, the other transmission device of the fixing-device-side transmission mechanism transmits the drive force, and a position of the other transmission device is moved while the other transmission device is connected to the one transmission device.

12. The image forming apparatus according to claim 8,
wherein the body-side transmission mechanism includes
an end portion, and
one transmission device disposed at the end portion thereof,
wherein the fixing-device-side transmission mechanism includes
an end portion, and
another transmission device disposed at the end portion thereof,
wherein the one transmission device and the other transmission device are disconnectably connected to each other,
wherein the other transmission device is movable while being connected to the one transmission device, and
wherein, during the detachment of the fixing device from the image forming apparatus body, the other transmission device of the fixing-device-side transmission mechanism transmits the drive force, and a position of the other transmission device is moved while the other transmission device is connected to the one transmission device.

13. The image forming apparatus according to claim 5,
wherein the pressure adjuster includes
a rotational shaft rotated by the drive force transmitted to the fixing-device-side transmission mechanism, and
an eccentric member having a center and an outer periphery,
wherein the center of the eccentric member is attached to the rotational shaft, wherein the eccentric member in which a distance between the center and the outer periphery is non-uniform is rotated, and wherein the pressure is adjusted by changing a distance between the pressure unit and the heating unit in accordance with the rotation of the eccentric member.

14. The image forming apparatus according to claim 6, wherein the pressure adjuster includes
    a rotational shaft rotated by the drive force transmitted to the fixing-device-side transmission mechanism, and
    an eccentric member having a center and an outer periphery,
wherein the center of the eccentric member is attached to the rotational shaft,
wherein the eccentric member in which a distance between the center and the outer periphery is non-uniform is rotated, and
wherein the pressure is adjusted by changing a distance between the pressure unit and the heating unit in accordance with the rotation of the eccentric member.

15. The image forming apparatus according to claim 7, wherein the pressure adjuster includes
    a rotational shaft rotated by the drive force transmitted to the fixing-device-side transmission mechanism, and
    an eccentric member having a center and an outer periphery,
wherein the center of the eccentric member is attached to the rotational shaft,
wherein the eccentric member in which a distance between the center and the outer periphery is non-uniform is rotated, and
wherein the pressure is adjusted by changing a distance between the pressure unit and the heating unit in accordance with the rotation of the eccentric member.

16. The image forming apparatus according to claim 8, wherein the pressure adjuster includes
    a rotational shaft rotated by the drive force transmitted to the fixing-device-side transmission mechanism, and
    an eccentric member having a center and an outer periphery,
wherein the center of the eccentric member is attached to the rotational shaft,
wherein the eccentric member in which a distance between the center and the outer periphery is non-uniform is rotated, and
wherein the pressure is adjusted by changing a distance between the pressure unit and the heating unit in accordance with the rotation of the eccentric member.

17. The image forming apparatus according to claim 9, wherein the pressure adjuster includes
    a rotational shaft rotated by the drive force transmitted to the fixing-device-side transmission mechanism, and
    an eccentric member having a center and an outer periphery,
wherein the center of the eccentric member is attached to the rotational shaft,
wherein the eccentric member in which a distance between the center and the outer periphery is non-uniform is rotated, and
wherein the pressure is adjusted by changing a distance between the pressure unit and the heating unit in accordance with the rotation of the eccentric member.

18. The image forming apparatus according to claim 10, wherein the pressure adjuster includes
    a rotational shaft rotated by the drive force transmitted to the fixing-device-side transmission mechanism, and
    an eccentric member having a center and an outer periphery,
wherein the center of the eccentric member is attached to the rotational shaft,
wherein the eccentric member in which a distance between the center and the outer periphery is non-uniform is rotated, and
wherein the pressure is adjusted by changing a distance between the pressure unit and the heating unit in accordance with the rotation of the eccentric member.

19. The image forming apparatus according to claim 11, wherein the pressure adjuster includes
    a rotational shaft rotated by the drive force transmitted to the fixing-device-side transmission mechanism, and
    an eccentric member having a center and an outer periphery,
wherein the center of the eccentric member is attached to the rotational shaft,
wherein the eccentric member in which a distance between the center and the outer periphery is non-uniform is rotated, and
wherein the pressure is adjusted by changing a distance between the pressure unit and the heating unit in accordance with the rotation of the eccentric member.

20. The image forming apparatus according to claim 12, wherein the pressure adjuster includes
    a rotational shaft rotated by the drive force transmitted to the fixing-device-side transmission mechanism, and
    an eccentric member having a center and an outer periphery,
wherein the center of the eccentric member is attached to the rotational shaft,
wherein the eccentric member in which a distance between the center and the outer periphery is non-uniform is rotated, and
wherein the pressure is adjusted by changing a distance between the pressure unit and the heating unit in accordance with the rotation of the eccentric member.

* * * * *